(12) United States Patent
Chau

(10) Patent No.: US 9,527,015 B2
(45) Date of Patent: Dec. 27, 2016

(54) UNIT, ASSEMBLY AND APPARATUS FOR TREATING FLUID

(76) Inventor: Yiu Chau Chau, Hong Kong (CN)

( * ) Notice: Subject to any disclaimer, the term of this patent is extended or adjusted under 35 U.S.C. 154(b) by 1129 days.

(21) Appl. No.: 13/582,904

(22) PCT Filed: Mar. 4, 2011

(86) PCT No.: PCT/CN2011/071525
§ 371 (c)(1),
(2), (4) Date: Nov. 26, 2012

(87) PCT Pub. No.: WO2011/110075
PCT Pub. Date: Sep. 15, 2011

(65) Prior Publication Data
US 2013/0068675 A1    Mar. 21, 2013

(30) Foreign Application Priority Data

Mar. 8, 2010    (CN) .......................... 2010 1 0128811

(51) Int. Cl.
*B01D 24/00*    (2006.01)
*B01D 24/48*    (2006.01)
(Continued)

(52) U.S. Cl.
CPC .............. *B01D 24/00* (2013.01); *B01D 24/14* (2013.01); *B01D 24/40* (2013.01);
(Continued)

(58) Field of Classification Search
USPC ........................................................ 210/285
See application file for complete search history.

(56) References Cited

U.S. PATENT DOCUMENTS

| 746,292 | A | * | 12/1903 | Clark ..................... B01D 35/18 |
| | | | | 210/285 |
| 3,469,696 | A | | 9/1969 | Petrucci et al. |

(Continued)

FOREIGN PATENT DOCUMENTS

| CN | 1232790 | 10/1999 |
| CN | 1894165 | 1/2007 |

(Continued)

OTHER PUBLICATIONS

"International Search Report," issued by the International Searching Authority in connection with International Application No. PCT/CN2011/071525, on Jun. 9, 2011 (9 pages).

(Continued)

*Primary Examiner* — Terry Cecil
(74) *Attorney, Agent, or Firm* — Hanley, Flight & Zimmerman, LLC

(57) ABSTRACT

A fluid treatment unit (1) is provided. The fluid treatment unit (1) comprises a chamber, in which at least one fine grinding fluid treatment medium is accommodated. The chamber has an inlet (15) for introduction of a fluid to be treated and an outlet (16) for discharge of a treated fluid. The inlet (15) is provided at a lower portion of the chamber and the outlet (16) is provided at an upper portion of the chamber. A fluid treatment device (100) adopting the above fluid treatment unit (1) is also provided. The fluid treatment unit (1) and the fluid treatment device (100) enable the fluid treatment medium to be self-cleaned and the fluid to be treated uniformly.

15 Claims, 11 Drawing Sheets

(51) Int. Cl.
*B01D 24/14* (2006.01)
*B01D 24/40* (2006.01)
*B01D 24/46* (2006.01)
*C02F 1/00* (2006.01)
*B01J 47/02* (2006.01)
*C02F 1/28* (2006.01)
*C02F 1/42* (2006.01)

(52) U.S. Cl.
CPC .......... *B01D 24/4631* (2013.01); *C02F 1/004* (2013.01); *B01J 47/026* (2013.01); *C02F 1/283* (2013.01); *C02F 1/42* (2013.01)

(56) References Cited

U.S. PATENT DOCUMENTS

| | | | | |
|---|---|---|---|---|
| 3,561,602 | A | * | 2/1971 | Molitor .................. C02F 1/003 210/266 |
| 3,854,902 | A | | 12/1974 | Kalen |
| 5,006,246 | A | * | 4/1991 | Edwards ................ B01J 47/022 210/264 |
| 5,017,286 | A | | 5/1991 | Heiligman |
| 5,415,770 | A | | 5/1995 | Heskett |
| 5,698,093 | A | | 12/1997 | Pyle et al. |
| 6,090,285 | A | * | 7/2000 | Chau .................... B01D 24/008 210/190 |
| 7,335,298 | B2 | * | 2/2008 | Axelrod ............... A01K 63/045 119/260 |
| 2004/0217045 | A1 | | 11/2004 | Gruca et al. |
| 2008/0290019 | A1 | | 11/2008 | Moss |

FOREIGN PATENT DOCUMENTS

| | | |
|---|---|---|
| CN | 1973948 | 6/2007 |
| CN | 1980718 | 6/2007 |
| CN | 200973994 | 11/2007 |
| CN | 200977424 | 11/2007 |
| CN | 101146587 | 3/2008 |
| WO | 2006101364 | 9/2006 |
| WO | 2007149497 | 12/2007 |

OTHER PUBLICATIONS

The State Intellectual Property Office of China, "First Notification of Office action", issued in connection with Chinese patent application No. 201010128811.1, mailed on Nov. 13, 2013, 18 pages.
The State Intellectual Property Office of China, "Search Report", issued in connection with Chinese patent application No. 201010128811.1, mailed on Nov. 13, 2013, 6 pages.
The State Intellectual Property Office of China, "Second Notification of Office action", issued in connection with Chinese patent application No. 201010128811.1, mailed on May 12, 2014, 10 pages.

* cited by examiner

UNIT, ASSEMBLY AND APPARATUS FOR TREATING FLUID

FIELD OF THE INVENTION

The present invention relates to a fluid treatment unit, and a fluid treatment assembly and a fluid treatment device that employ the fluid treatment unit.

BACKGROUND OF THE INVENTION

A fluid treatment device generally uses one or several fluid treatment mediums to treat various fluids, such as water and so on, and generally contains one or more fluid treatment units accommodating the fluid treatment mediums. When fluid passes through a fluid treatment medium, the impurities and pollutant contained therein are removed by physical-chemical reaction with the treatment mediums. A typical example of such fluid treatment device is a device for purifying and softening water. By this device, on one hand, chemical pollutants, such as chlorine, heavy metals and sulfides, particle pollutants and the like in water are removed; and on the other hand, the water is softened due to removing calcium and magnesium in water. Such water treatment device may provide purified water suitable for direct drinking and washing water for families. Currently, it has been an important appliance for family life, especially for Chinese families.

Such device is disclosed in the prior art. For instance, U.S. Pat. No. 5,415,770 discloses that a fine grinding copper-zinc alloy is used to remove chemical pollutant (e.g., chlorine) during the pretreatment of water before being subjected to a water-softening ion exchange medium, whereby a lifetime of the ion exchange medium is prolonged. Alternatively, the fine grinding copper-zinc alloy may also be used to perform a post treatment to the water.

Publication document No. CN1232790A of Chinese patent application for invention also discloses a tank treatment assembly used for treating water. In the tank treatment assembly as disclosed, the water flows through each treatment unit by gravity and pressure, the each treatment unit comprises a chamber for accommodating a fluid treatment medium. The chamber has a substantially annular section. The water to be treated enters into the annular chamber from the top of the chamber, and the water treated by the treatment medium is discharged out of the chamber from the bottom of the chamber. In this treatment unit, as the water substantially flows along a diagonal of the chamber, both the flow route and the dwell time in the chamber are increased, thereby improving the treatment efficacy.

As for such treatment unit and a treatment device employing the same, it is necessary to perform a backwash washing frequently. This is because that dirt in the water will be deposited and adhered to the surface of the treatment medium. When the dirt excessively accumulates on the surface of the treatment medium, on the one hand, the treatment medium will lose efficacy, and on the other hand, the fluid will be "clogged" due to the pressure drop of the fluid flowing through the treatment unit being too large. Besides, when a water flow flows through the treatment medium from top to bottom, if the treatment medium has an uneven thickness in the treatment unit, then most of the water flow is prone to pass through a region where the treatment medium has a smaller thickness. That is to say, the treatment medium merely can partially exert its treatment efficacy.

SUMMARY OF THE INVENTION

An object of the present invention is to avoid and eliminate the aforementioned shortcomings.

Accordingly, a first aspect of the present invention provides an improved fluid treatment unit. The fluid treatment unit of the present invention comprises a chamber accommodating a fluid treatment medium therein, the chamber having an inlet for introduction of a fluid to be treated and an outlet for discharge of a treated fluid, wherein the inlet is provided at a lower portion of the chamber and the outlet is provided at an upper portion of the chamber.

In such fluid treatment unit, the fluid to be treated flows through the chamber of the fluid treatment unit from bottom to top; at this time, a treatment medium in the chamber, which is generally granular, shows an upward irregular movement trend as a whole under the action of impact and collides with one another so as to efficiently clean the dirt adhering to the medium itself. In this way, it effectively guarantees that the surface of the treatment medium particles can be in direct contact with and get rid of some chemical substances in the fluid. Since there is no dirt filling in the gaps between the medium particles, the fluid can smoothly flow through these medium particles without generation of a larger pressure drop. Additionally, as the treatment medium particles show an upward movement trend under the action of the fluid flowing from bottom to top, the medium particles are evenly distributed in the chamber of the treatment unit and have a uniform thickness, so that the fluid can be treated uniformly. Generally, the treatment medium in the treatment unit will not fill up a whole chamber of the treatment unit. This on one hand provides a sufficient space for movement of the treatment medium, and on the other hand can avoid a pressure drop before and after the water passing though the treatment unit being too large. However, if necessary, the treatment medium may also fill up the whole chamber.

The fluid treatment unit of the present invention may be used for treating water. However, obviously, it may also be used for treatment of other fluids, for example, petrol, ethanol and so on.

The chamber of the fluid treatment unit of the present invention may be configured in any suitable shape, such as, a cylindrical shape, a spherical shape or a parallelepiped shape. In a preferred embodiment, the chamber is in a ring cylindrical shape and is formed by a cylindrical inner wall, a cylindrical outer wall enclosing the inner wall and spaced therefrom, and an upper wall and a lower wall between the inner and outer walls, wherein the upper wall is located above the lower wall and spaced therefrom. In this chamber, the inlets and outlets are provided according to a principle of the inlet being provided at a lower portion and the outlet being provided at an upper portion, e.g., the inlet is provided at the lower wall and/or a lower portion of the inner wall, and the outlet is provided at the upper wall and/or an upper portion of the outer wall, or the inlet is provided at the lower wall and/or a lower portion of the outer wall, and the outlet is provided at the upper wall and/or an upper portion of the inner wall.

A second aspect of the present invention provides a fluid treatment assembly employing the above fluid treatment unit. The fluid treatment assembly comprises an assembly inlet for introduction of a fluid to be treated and an assembly outlet for discharge of a treated fluid, the fluid treatment assembly comprising a plurality of vertically stacked fluid treatment units, each fluid treatment unit comprising a chamber accommodating at least one fluid treatment medium therein, the chamber having a unit inlet for introduction of a fluid to be treated and a unit outlet for discharge of a treated fluid, the fluid treatment assembly further comprising an introduction passage and a discharge passage, the introduction passage guiding the fluid from the assembly inlet to the unit inlet of each fluid treatment unit, the discharging passage guiding the fluid from the unit outlet to the assembly outlet, wherein the unit inlet of each fluid treatment unit is provided at a lower portion of the chamber and the unit outlet thereof is provided at an upper portion of the chamber.

Preferably, the fluid treatment assembly according to the present invention further comprises an outer cylinder enclosing the outer walls of respective vertically stacked fluid treatment units; a first passage being formed by the inner walls of the vertically stacked fluid treatment units; a second passage being formed between the outer cylinder and the outer walls of respective treatment units, or being constituted by upper portions of the outer walls of the respective treatment units and/or openings of upper walls of the respective treatment units providing that no outer cylinder is present; the first passage being the introduction passage and the second passage being the discharge passage. Of course, the first passage may also serve as the discharge passage and the second passage serves as the introduction passage.

By setting the outer cylinder, on one hand, the whole assembly can be used individually as a whole or be used in combination with other assemblies by using the outer cylinder as an outer housing to accommodate respective units; on the other hand, it is conductive to combining respective units of the assembly together more firmly.

The fluid treatment assembly according to the present invention may also comprise an inner cylinder extending in a space formed by the inner walls of respective vertically stacked fluid treatment units, the first passage being formed between the inner cylinder and the inner walls of respective treatment units.

The fluid treatment device according to the present invention employs at least one of the fluid treatment unit or the fluid treatment assembly as above. This device uses a tank body as its housing, and an introduction inlet for introduction of the fluid and a discharge outlet for discharge of the fluid are provided on the tank body. The fluid treatment unit or the fluid treatment assembly is accommodated in the tank body. A number of the fluid treatment unit or the fluid treatment assembly can be determined upon actual conditions, relationships of connection in parallel or connection in series of the fluid treatment units or the fluid treatment assemblies, and combination forms like vertical stacking or being arranged side by side also can be determined upon actual conditions.

BRIEF DESCRIPTION OF THE DRAWINGS

Preferred embodiments of the present invention will be described as below with reference to accompanying drawings, wherein.

REFERENCE NUMERALS

100 Water Treatment Device
101 Tank Body
1 Treatment Unit
10 Treatment Assembly
102 Introduction Inlet
103 Discharge Outlet
11 Inner Wall
12 Outer Wall
13 Upper Wall
14 Lower Wall
15 Unit Inlet
16 Unit Outlet
19 Support Plate
17 Inner Cylinder
18 Outer Cylinder
V By-pass Valve
21 Annular Flange
22 Protrusion
23 Extension Portion
24 First Annular Flange
25 First Cylindrical Protrusion
26 Second Annular Flange
27 Second Cylindrical Protrusion
3 Adaptor
31 Adapting Partition Boards
32 Adapting Outer Wall
33 Adapting Inner Wall
34 First Branch Passage
35 Second Branch Passage
4 Connector
41 Connection Partition Board
42 First Mouthpiece
43 Second Mouthpiece
44 Connection Inner Wall
45 Connection Outer Wall
5 Guide Plate
51 Connector
50 Guide Unit
52 Separating Ring

DETAILED DESCRIPTION OF THE EMBODIMENTS

Referring to above explanations, it can be known that the fluid treatment unit and respective assemblies and devices including the same can be used for, but not exclusively, water treatment. It is used for water treatment in its optimized use. For the convenience of expression, a water treatment device, assembly and device are taken as examples hereinafter to introduce the present invention.

Figure 1A:
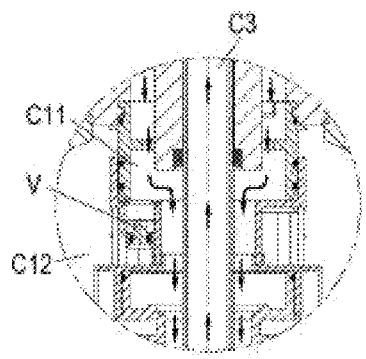
FIG. 1A is a partially enlarged view of FIG. 1, and shows a state of a by-pass one-way valve at the time when the device is normally operated.
Figure 1B:
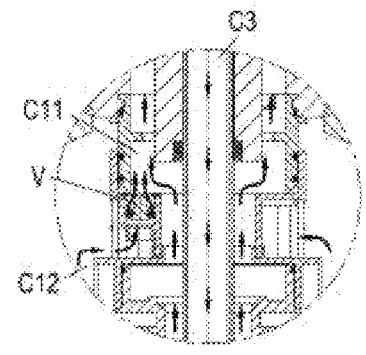
FIG. 1B shows a state of the one-way valve as illustrated in FIG. 1A at the time when a backwash is performed.
Figure 1:
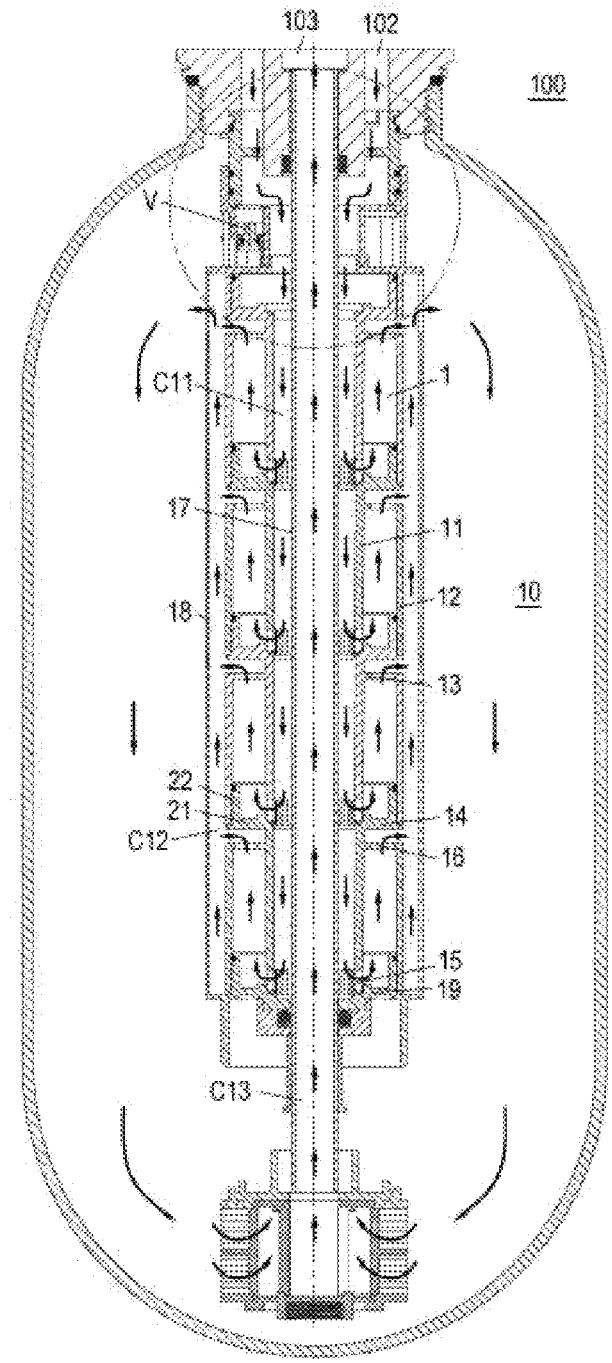
FIG. 1 is a schematic sectional view of a fluid treatment device according to a first embodiment of the present invention, which comprises a fluid treatment assembly having a plurality of fluid treatment units.

FIG. 1 is a schematic sectional view of the water treatment device according to a first embodiment of the present invention. The water treatment device of the present invention is represented by a reference numeral 100 as a whole. The device generally comprises an elongated tank body 101 accommodating a treatment assembly 10 consisting of a plurality of vertically stacked treatment units 1 and fine grinding fluid treatment mediums stacked in the tank body and so on. The tank body further comprises an opening at the top thereof, and a control unit is mounted at the opening. The control unit conventionally comprises a control valve (not shown) for introduction of the water into the tank body for the convenience of treatment and discharge of the treated water when the device is in normal operation. The control unit generally further comprises a timing mechanism that backwashes the device so as to be convenient for regeneration and/or washing, or other mechanisms (not shown). The opening of the tank body mainly comprises an introduction inlet 102 for introduction of the water into the tank body and a discharge outlet 103 for discharge of the water from the tank body when the device is in normal operation. The introduction inlet 102 and the discharge outlet 103 may be provided with any suitable sectional shapes and arrangement manners. In this embodiment, the discharge outlet 103 is set as being in a circular shape, while the introduction inlet 102 is set as being a circular ring shape enclosing the discharge outlet 103 and concentric therewith.

As shown in FIG. 1, the water treatment device in this embodiment schematically illustrates a treatment assembly 10 consisting of four vertically stacked treatment units. It should be appreciated that a person skilled in the art may adopt any suitable number of the treatment assemblies and the treatment units. Four treatment units shown in FIG. 1 each is a cylinder with a section in a circular ring shape, an axial direction of the cylinder is the same as that of the tank body, which is generally a vertical direction in normal use. It should also be appreciated that the shape of the treatment unit in the present invention is not limited to this, and a person skilled in the art may use any suitable shape, such as, a solid cylindrical shape, a cuboid shape, a spherical shape, etc. As shown in the drawing, each treatment unit consists of a cylindrical inner wall 11, a cylindrical outer wall 12 enclosing the inner wall 11 and concentrically spaced therefrom, and an upper wall 13 and a lower wall 14 between the inner wall 11 and the outer wall 12, wherein the upper wall 13 is located above the lower wall 14 and spaced therefrom. The inner wall 11, the outer wall 12, the upper wall 13 and the lower wall 14 together form a chamber in which a water treatment medium is accommodated.

In the present invention, the fluid treatment medium is preferably made of a granular material. Particles in an irregular shape (e.g., KDF-55 or KDF-85 of KDF®, active carbon particles) or spherical particles having an average size (for example, various ion-exchange resin particles) are suitable. Generally, the treatment medium will not fill up a whole chamber. This on one hand provides a sufficient space for movement of the treatment medium, and on the other hand can avoid a pressure drop before and after the water passing though the treatment unit being too large.

The chamber comprises a unit inlet 15 for introduction of the water to be treated and a unit outlet 16 for discharge of the treated water. As shown in FIG. 1, the inlet 15 is provided at a lower portion of the inner wall 11, while the outlet 16 is provided on the upper wall 13. Of course, other arrangements of the inlet and outlets are also easily conceivable for a person skilled in the art based on the teaching from the present invention. A basic object of the present invention can be achieved as long as it is guaranteed that the inlet is below the outlet. Both the inlet 15 and outlet 16 of the treatment unit are elongated slits, and an object of such arrangement is to block the medium particles and to prevent from being clogged by the medium particles. A person skilled in the art easily conceives of, on the basis of this, providing the inlet 15 and outlet 16 in other shapes, such as elliptic shape, curved shape, grid shape, etc. In addition to the elongated slits, filter screen, filter cotton or suitable filtration methods or materials can also be used for the unit inlet 15 and unit outlet 16 of the treatment unit.

Respective units in this embodiment are vertically stacked to form the treatment assembly. The treatment assembly uses the axis of the cylindrical treatment unit as its own axis and extends in a vertical direction. As shown in FIG. 1, in two adjacent stacked units, the inner wall 11 of a lower unit is higher than the upper wall 13 thereof by some distance, and extends radially outwardly from an upper end of the inner wall 11 to form an annular flange. The flange is located above the upper wall 13 and spaced from the upper wall 13, and extends upwardly at the radial outer side of the flange to form a cylindrical protrusion. In assembly, the inner cylinder of the upper unit is cooperated with the radial inner side of the annular flange of the lower unit, and its outer cylinder is hermetically cooperated with cylindrical protrusion of the lower unit, so that the annular flange of the lower unit servers as the lower wall 14 of the upper unit. An individual support plate 19 is provided below the lowermost unit, the flange of the support plate 19 serves as the lower wall 14 of the lowermost unit. These units may be easily separated from one another and it is possible to stack each unit on a previous unit in sequence so as to be convenient for using a group of similar units to combine to a treatment assembly having a suitable size, and thus makes the manufacturing and assembly be simplified. The detachable connection of the respective units of the present invention is realized by using a bayonet coupling manner. It should be appreciated that detachable connection and stacking of respective units of the present invention can be realized by any feasible structure, for example, a threaded joint and/or an oppositely openable buckling and pressing type joint. The vertical stacking even can be realized by arranging respective units on different locations of a bracket.

In order to form a passage from the introduction inlet 102 of the tank body to the inlet 15 of each treatment unit, an inner cylinder is provided in a cylindrical space formed by inner walls 11 of respective treatment units in this embodiment, and a passage (hereinafter referred to as a first passage) for guiding water to each treatment unit is formed between the inner cylinder and the inner walls 11 of each treatment unit, the water entering into the tank body from the introduction inlet 102 flows toward each treatment unit along the first passage. One end of the inner cylinder is communicated with the discharge outlet 103 of the tank body, the other end thereof is optionally communicated with the fine grinding fluid treatment medium in the tank body so as to form a passage (hereinafter referred to as a third passage) for discharge of a treated fluid out of the tank body in the interior of the inner cylinder. An outer cylinder is provided outside of the respective treatment units and enclosing the respective treatment units, an upper portion of the outer cylinder is provided with an opening and a bottom thereof is sealed. Thus, passages through which the water is allowable to flow are formed both between the outer cylinder and the unit outer wall 12 and between the outer cylinder and the tank body (both of the passages are collectively called as a second passage). If providing that there is no outer cylinder, upper portions of the outer walls and/or openings on the upper walls of respective treatment units constitute the second passage. The water flowing out from the respective treatment units flows out of the upper openings of the outer cylinder through the passage between the outer cylinder and the unit outer wall 12, and subsequently flows into the tank body through the passage between the outer cylinder and the tank body. The water arriving at the tank body enters into the inner cylinder after being filtrated by the fine grinding fluid treatment medium in the tank body and subsequently is discharged from the discharge outlet 103. The above construction for passages is merely exemplary explanation. A person skilled in the art would easily conceive according to the teaching from the present invention that passages in any other form may also be used. For example, a pipe may be used as the first passage to supply water for each treatment unit, or a pipe is used or the tank body is directly used without a pipe to receive the water discharged from each treatment unit and to deliver the water to the fine grinding fluid treatment medium in the tank body. With respect to the fine grinding fluid treatment medium per se in the tank body, it is also not necessary. It is possible for the present invention to directly guide the water from the treatment units to the discharge outlet 103 of the tank body through a channel.

In addition, the four treatment units shown in FIG. 1 constitute a treatment assembly in a parallel manner, water flow passes through the respective treatment units in parallel (or untreated water flow simultaneously flows to the respective treatment units), so that an optimized minimum pressure drop can be realized. However, a person skilled in the art would easily conceive of other combination manners on the basis of this. For example, in one treatment assembly, at least two treatment units are arranged in series, that is, an outlet 16 of one treatment unit is communicated with an inlet 15 of the other treatment unit, the water flow passes through these two treatment units in sequence. Such units arranged in series are capable of ensuring that the water is purified more sufficiently. Moreover, different treatment mediums may be placed in the chambers of such two or more treatment units arranged in series so as to achieve a comprehensive treatment efficacy.

An arrow in FIG. 1 shows a direction of the water flow when the water treatment device is in normal operation. As shown in the drawing, the untreated water enters into the device from the introduction inlet 102 of the tank body under the action of a certain pressure. The water flow flows along the first passage between the inner cylinder and the unit inner wall 11, and enters into respective units from the inlets 15 at the lower portions of the inner walls 11 of the respective units. Under the action of the pressure, the water flows through the typically granular water treatment medium in the chambers of the units from bottom to top, the chlorine, heavy metals and sulfides in the water are removed by the medium. The water flowing out from the treatment units rises along the second passage between the outer cylinder and the unit outer wall 12, and flows out of the outer cylinder from the upper openings of the outer cylinder. The water flowing out from the outer cylinder flows to the fine grinding fluid treatment medium in the tank body along the second passage between the tank body and the outer cylinder, and thus is filtrated. The water passing through the fine grinding treatment medium in the tank body flows to the discharge outlet 103 of the tank body along the third passage formed by the inner cylinder, and is discharged finally.

After the fluid treatment device have been working for a period of time, it is possibly necessary to backwash the device, particularly, the device provided with the fine grinding treatment medium in the tank body is required to be backwashed regularly. In backwash, the control unit located at an opening of the tank body guides a water for backwash into the discharge outlet 103, the water for backwash substantially flows in a direction contrary to the arrow direction indicated in FIG. 1, and is finally discharged from the introduction inlet 102.

In the process of the backwash, the water for backwash will carry the dirt that has been washed away, for example, the dirt washed away by the fine grinding fluid treatment medium in the tank body. If the water for backwash carrying the dirt completely flows through the treatment unit, the dirt in the water will be at least partially deposited on the medium particles in the treatment unit. In order to reduce or eliminate the possibility that the treatment unit might be contaminated by the dirt. A by-pass valve is provided between the second passage and the first passage according to the present invention. FIGS. 1A and 1B are partially enlarged views of FIG. 1, and illustrate the states of the by-pass valve when it is in normal operation and in backwash.

As shown in FIG. 1, the by-pass valve is provide above the treatment assembly, substantially faces the introduction inlet 102, and is located within a range of an outer diameter of the outer cylinder. The by-pass valve arranged as such will not increase a radial size of the treatment assembly. A one-way valve is preferably used as the by-pass valve. The one-way valve is opened when a water pressure within the second passage is greater than that within the first passage so as to allow the water flow flows from the second passage toward the first passage. When the above one-way passage is employed, under the circumstance of the backwash, the water flow passes from the third passage through the fine grinding treatment medium in the tank body and arrives at the second passage, a part of the water in the second passage enters into the first passage through the treatment units, another part of the water in the second passage enters into the first passage through the opened one-way valve. The one-way valve in this embodiment is preferably a differential pressure open one-way valve with a simple structure, which is opened when the differential pressure between the second passage and the first passage exceeds a threshold. In addition, it is preferable that the open threshold of the one-way valve is adjustable so that a proportion of a fluid passing through the one-way valve and that passing through the treatment unit can be adjusted. Generally, in order to avoid contamination to the treatment medium, the open threshold of the one-way valve should be set as low as possible so that most of the water flow, even all of the water flow, can be discharged through the one-way valve.

Figure 2:
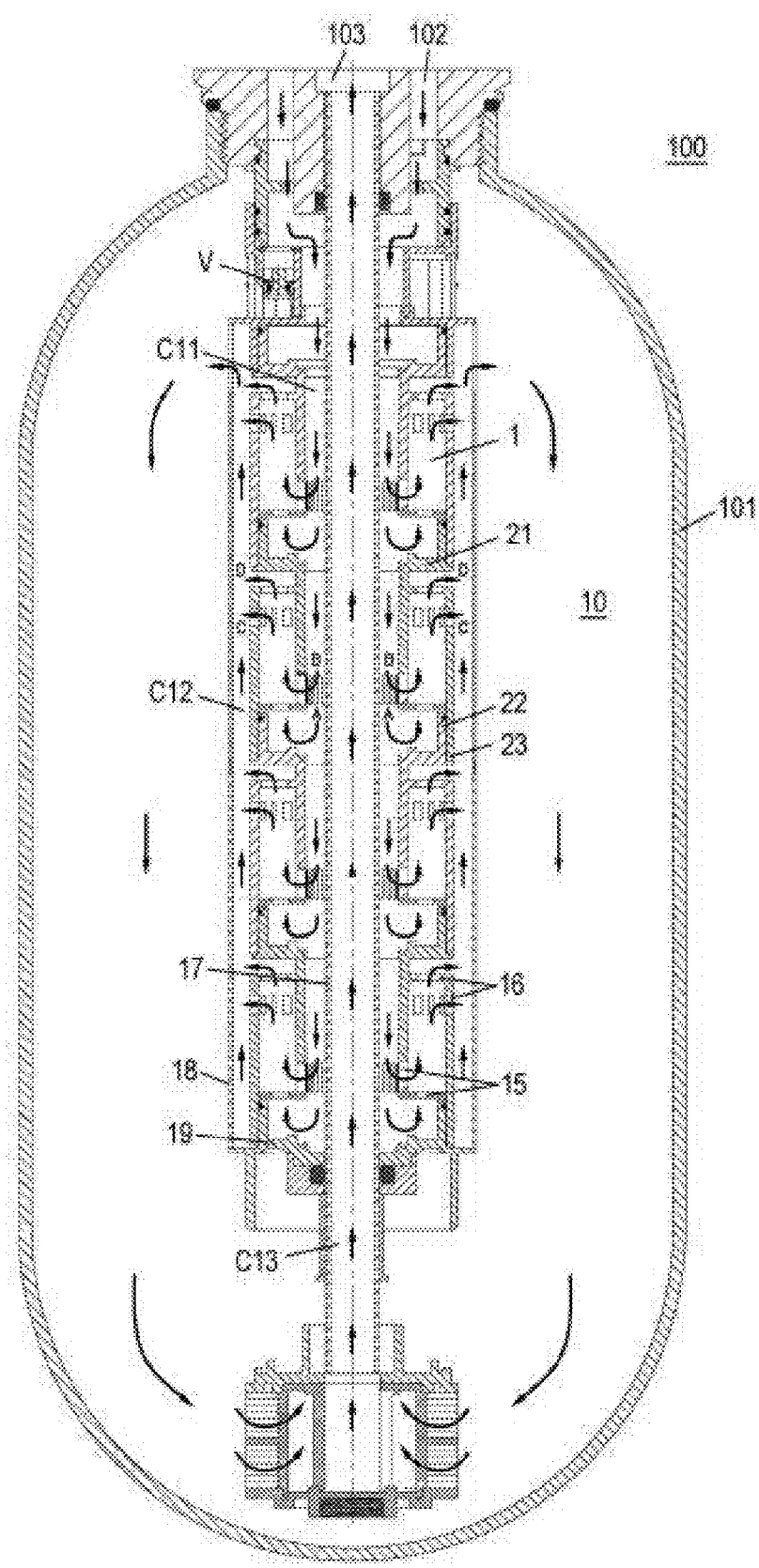
FIG. 2 is a schematic view of a fluid treatment device according to a second embodiment of the present invention.

FIG. 2 is a schematic view of the fluid treatment device according to a second embodiment of the present invention. This embodiment is similar to the first embodiment. The same configurations in FIG. 2 as those in FIG. 1 are not repeatedly described herein. In comparison with the first embodiment, the arrangements of the inlet 15 and the outlet 16 of the treatment unit in this embodiment are different from that in the first embodiment. As shown in the drawing, the inlets 15 of the respective treatment units are provided at the bottom wall and a low portion of the inner wall 11, while the outlets 16 are provided on the upper wall 13 and the upper portion of the outer wall 12. Thus, in comparison with the first embodiment, an amount of water passing through the treatment unit is increased per unit time under a same pressure. That is, a treatment capability of the unit is increased.

Additionally, in this embodiment, in order to achieve vertical stacking of the units, each unit has an annular flange extending from the inner wall 11, which is located above the upper wall 13 and is spaced therefrom, and a cylindrical extension portion extending downwardly from the outer wall 12. The above annular flange is integrally formed with the inner wall 11, and thus has an inner diameter the same as that of the inner cylinder and has an outer diameter the same as that of the outer cylinder. A radial outer side of the annular flange is integrally connected with a cylindrical protrusion extending upwardly which is able to be hermetically cooperated with the downwardly extended extension portion of the outer wall 12. Thus, with the help of the cooperation of the extension portion of an upper unit and the protrusion of a lower unit, two units can be stacked together. In two stacked upper and lower units, the outlet 16 of the lower unit is spaced from the inlet 15 of the upper unit by the annular flange and hermetically cooperated protrusion and extension portion so as not to confuse the water flow.

Figure 3:
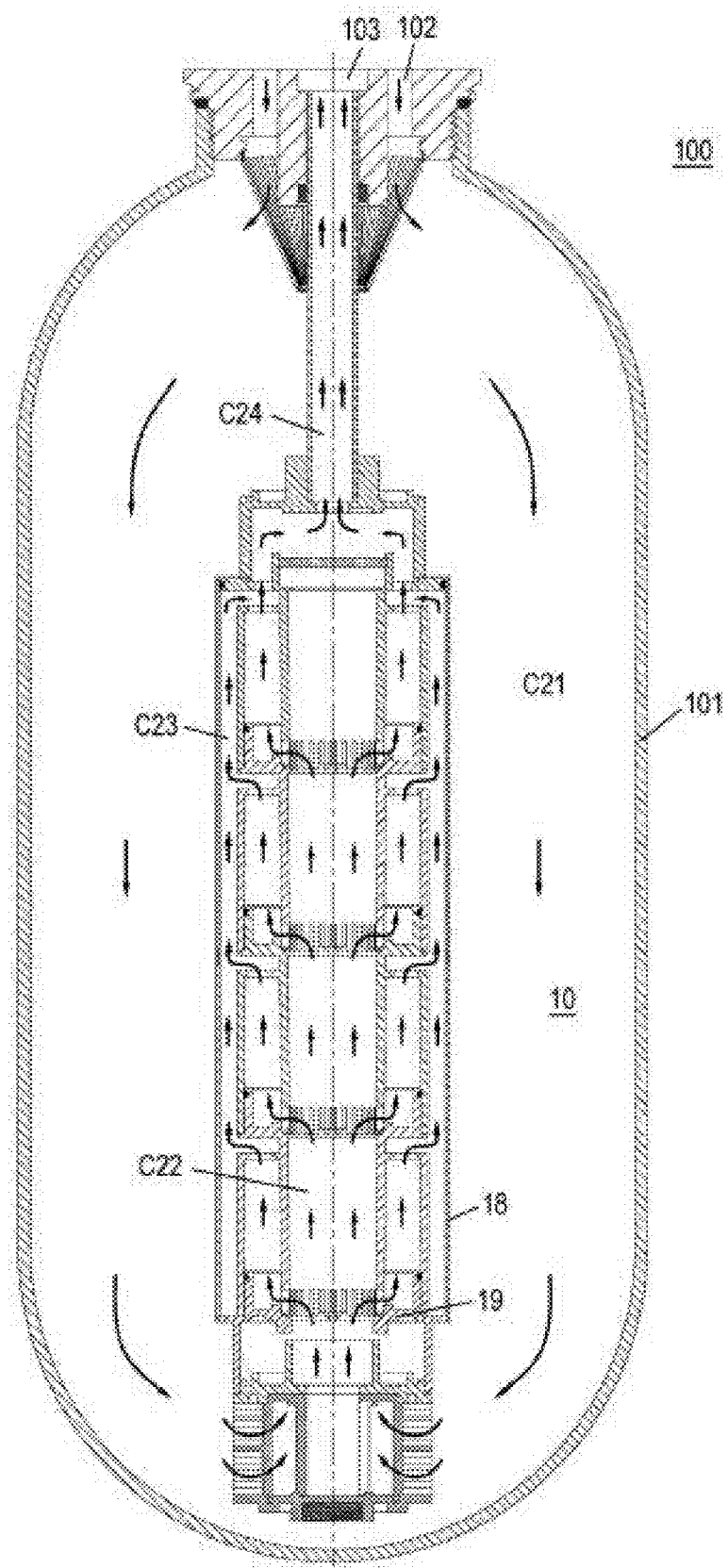
FIG. 3 is a schematic view of the fluid treatment device according to a third embodiment of the present invention.

FIG. 3 is a schematic view of the fluid treatment device according to a third embodiment of the present invention. A configuration of the treatment assembly and a water flow direction in this embodiment are different from those in both embodiment 1 and embodiment 2. As shown in the drawing, the treatment assembly in this embodiment exemplarily includes four treatment units, wherein an upper portion of the inner wall 11 of the treatment unit at the top is sealed. The treatment assembly merely comprises an outer cylinder but without an inner cylinder. At this time, the discharge outlet 103 in the opening of the tank body is a circular opening, while the introduction inlet 102 is an annular opening enclosing the discharge outlet 103 and spaced therefrom. As indicated by the arrows in FIG. 3, the water flow enters into the tank body from the introduction inlet 102, and sequentially flows through a first passage between the outer cylinder and the tank body, the fine grinding treatment medium which is preferably provided in the tank body, a second passage formed by the inner walls 11 of the vertically stacked respective treatment units, each treatment unit, a third passage between the outer cylinder and the outer walls 12 of respective treatment units, a fourth passage constituted by a tube joint connected with the outer wall 12 and a circular pipe connected with the discharge outlet 103, and is finally discharged through the discharge outlet 103.

In this embodiment, the water is firstly filtrated by the fine fluid grinding treatment medium in the tank body, and is then treated by the treatment units. In the treatment device with the arrangement as above, the dirt is blocked by the fine grinding fluid treatment medium in the tank body, and would not enter into the treatment units. When a backwash is performed, water for backwash flowing in a direction contrary to that indicated by the arrows in the drawing smoothly flows out of the tank body through the first passage after washing away the dirt deposited on the surface of the fine grinding treatment medium in the tank body. Thus, in this embodiment, a by-pass valve may not be provided even if a backwash-type filter is employed, since the dirt departing from the fine grinding fluid treatment medium in the tank body is directly discharged out of the tank body.

In this embodiment, the stacking connection structure of respective treatment units is similar to that in the first embodiment. That is to say, in two stacked upper and lower units, the lower unit has an annular flange that is integrally formed with the inner wall 11, and the annular flange is located above the upper wall 13 and is spaced therefrom so as to allow the water to flow out from the outlet 16 formed on the upper wall 13. A radial outer side of the annular flange is integrally connected with a cylindrical protrusion extending upwardly. The upper unit comprises a cylindrical extension portion extending downwardly from the outer wall 12. Here, the cylindrical protrusion of the lower unit is able to be hermetically cooperated with the extension portion of the upper unit. In this embodiment, the outlet 16 of the uppermost unit directly leads to the tube joint, while the lowermost unit is hermetically connected with a support plate 19 therebelow.

Figure 4:
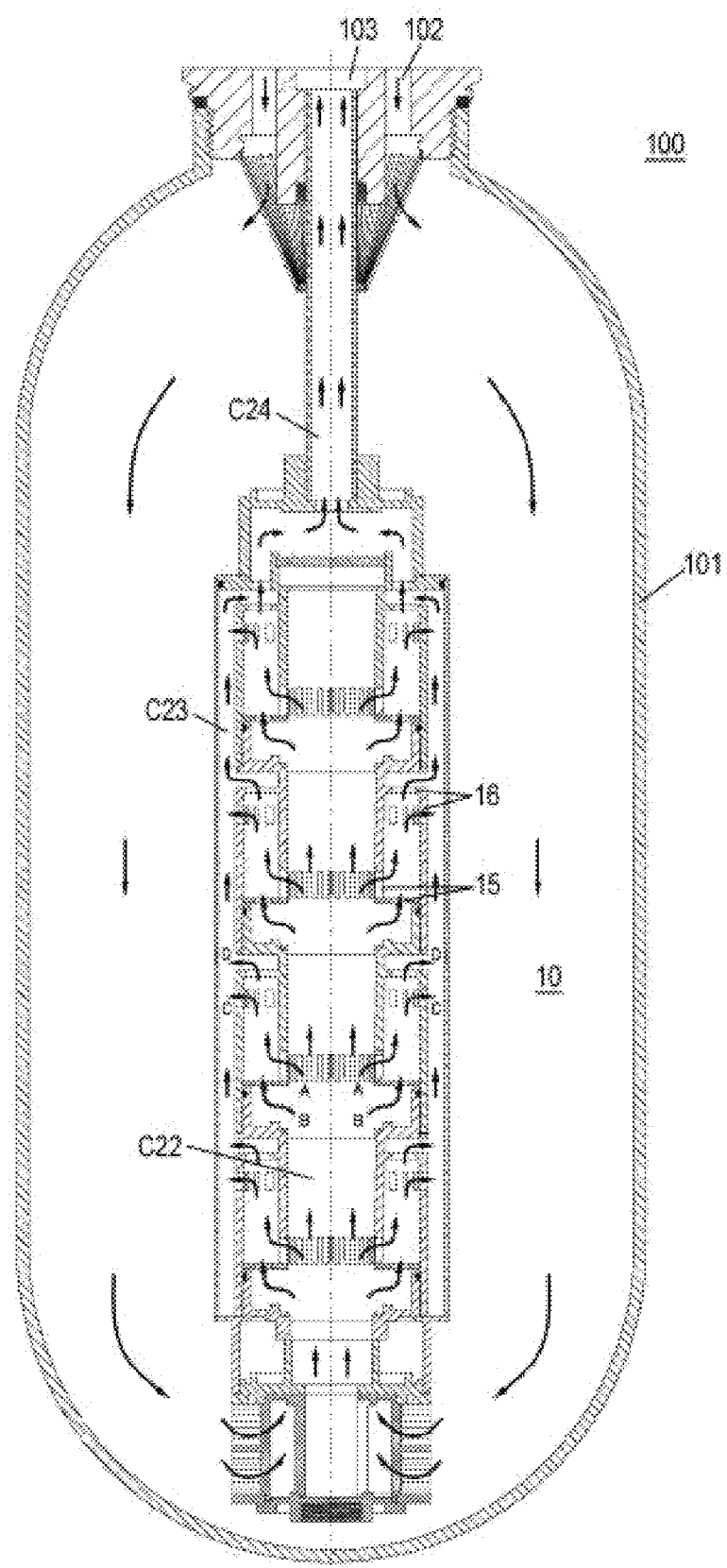
FIG. 4 is a schematic view of a fluid treatment device according to a fourth embodiment of the present invention.

FIG. 4 is a schematic view of the fluid treatment device according to a fourth embodiment of the present invention. A basic configuration of the treatment device and a water flow path in this embodiment are same as those in the above third embodiment (as shown in FIG. 3), and the same content is not repeatedly described herein. This embodiment differs from the third embodiment in that, the arrangements of the inlet 15 and the outlet 16 of the treatment unit are different from that of the third embodiment. As shown in the drawing, the inlets 15 of each treatment unit are provided at the bottom wall and the low portion of the inner wall 11, while the outlets 16 are provided on the upper wall 13 and the upper portion of the outer wall 12. Thus, in comparison with the third embodiment, a treatment capability of the unit is increased under a same pressure.

Additionally, the configurations of each unit in this embodiment are similar to those in the second embodiment (as shown in FIG. 2). As shown in FIG. 4, each unit except for the uppermost unit comprises an annular flange extending from the inner wall 11, which is located above the upper wall 13 and is spaced therefrom, and a cylindrical extension portion extending downwardly from the outer wall 12. The above annular flange is integrally formed with the inner wall 11, thus has an inner diameter the same as that of the inner cylinder and has an outer diameter the same as that of the outer cylinder. A radial outer side of the annular flange is integrally connected with a cylindrical protrusion extending upwardly which is able to be hermetically cooperated with the downwardly extended extension portion of the outer wall 12. Thus, with the help of the cooperation of the extension portion of an upper unit and the protrusion of a lower unit, the two units can be stacked together. The uppermost unit has an extension portion which is cooperated with the lower unit, but does not have the annular flange and the extension portion. The outlet 16 of the unit directly leads to the tube joint. Due to omission of the annular flange and the extension portion of the uppermost unit, it is conductive to reducing a height of treatment assembly so as to facilitate arrangement of more treatment units in the limited space of the tank body.

Figure 5:
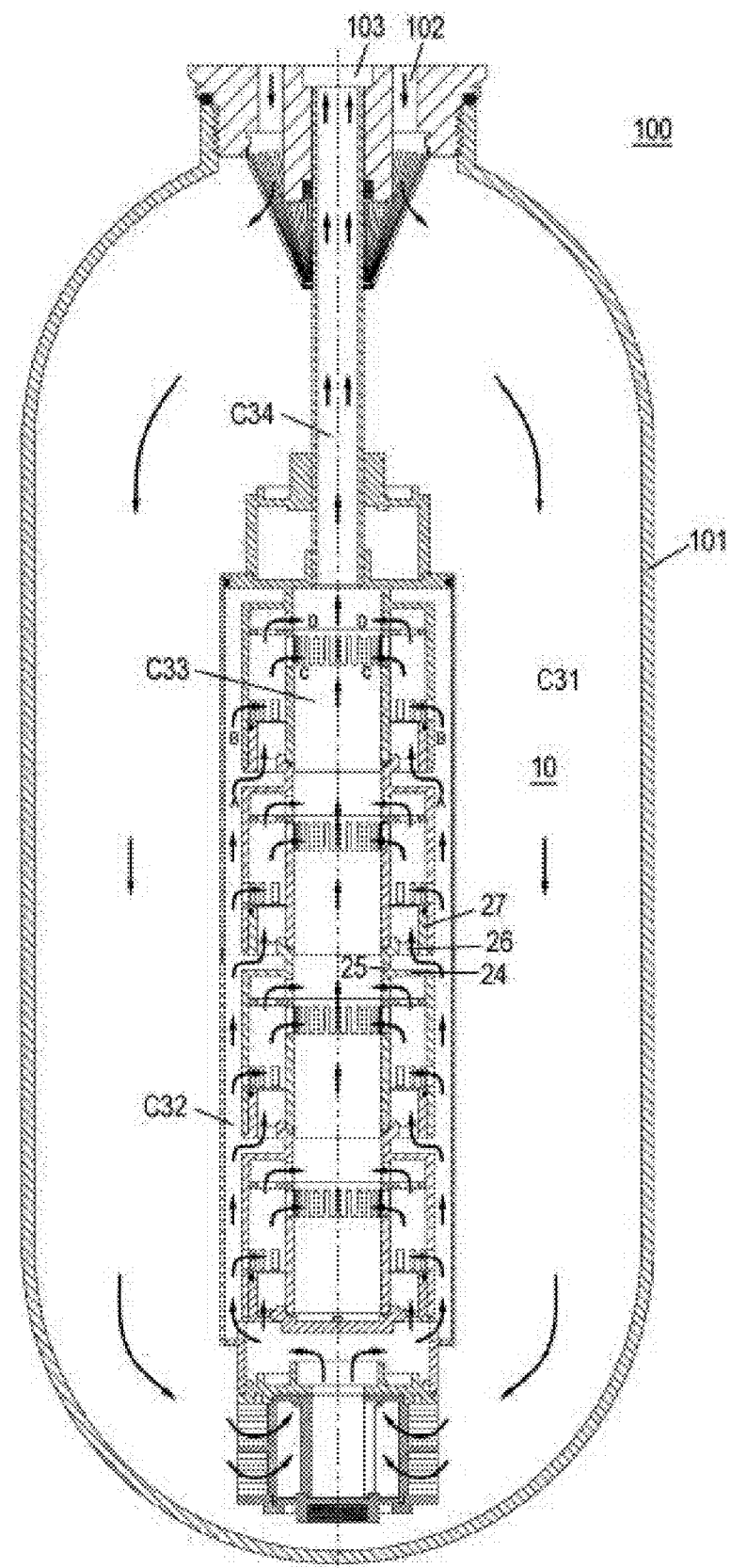
FIG. 5 is a schematic view of a fluid treatment device according to a fifth embodiment of the present invention.

FIG. 5 is a schematic view of the fluid treatment device according to a fifth embodiment of the present invention. The configurations in this embodiment the same as those in previous embodiments are not repeatedly described herein.

As shown in the drawing, the treatment assembly in this embodiment exemplarily includes four treatment units, wherein a bottom of an inner wall 11 of the lowermost treatment unit is sealed. The treatment unit merely comprises an outer cylinder but without an inner cylinder. As indicated by the arrows in the drawing, water flow enters into the tank body from the annular introduction inlet 102, and sequentially flows through the first passage between the outer cylinder and the tank body, the fine grinding fluid treatment medium which is preferably provided in the tank body, a second passage between the outer cylinder and the outer walls 12 of the vertically stacked respective treatment units, each treatment unit, a third passage formed by the inner cylinders of respective treatment units, a fourth passage constituted by a tube joint connected with the outer wall 12 and a circular pipe connected with the discharge outlet 103, and is finally discharged through the discharge outlet 103.

In this embodiment, the inlets 15 of each treatment unit are provided at the lower wall 14 and the low portion of the outer wall 12, while the outlet 16 are provided at the upper wall 13 and the upper portion of the inner wall 11. The water flow flows through each treatment unit from outside to inside and from bottom to top.

In two adjacent stacked treatment units in this embodiment, the outer wall 12 of the lower unit extends upward and goes beyond the upper wall 13 by some distance, and extends inwardly at the upper end to form a first annular flange, which is located above the upper wall 13 and is spaced therefrom so as to allow water to flow out from the outlet 16 formed on the upper wall 13; the first annular flange extends upwardly at a radial inner side to form a first cylindrical protrusion having an inner diameter the same as that of the inner cylinder; the upper end of the first cylindrical protrusion extends outwardly to form a second annular flange which is located above the first annular flange and is spaced therefrom, and an opening, such as a slit, serving as the inlet 15 is provided on the second annular flange; the second annular flange extends upwardly at a radial outer side thereof to form a second cylindrical protrusion. In adjacent two stacked treatment units, the inner wall of the upper unit is hermetically cooperated with the first cylindrical protrusion of the lower unit, the outer wall 12 of the upper unit is hermetically cooperated with the second cylindrical protrusion of the lower unit so that the second annular flange of the lower unit serves as the lower wall 14 of the upper unit.

Several embodiments in which the treatment assemblies are used in combination will be described below. A general design concept upon which these embodiments are based is that, at least two treatment assemblies are combined in the tank body, the water introduced from the introduction inlet 102 of the tank body is discharged from the discharge outlet 103 of the tank body after being treated by the inner treatment assemblies. A person skilled in the art, under the guide of such design concept, can freely determine a number of the treatment assembly upon actual conditions, select parallel or series connection relationship between these treatment assemblies, and determine that whether the two or more assemblies are vertically stacked or arranged side by side.

Figures 6, 6A, 6B:
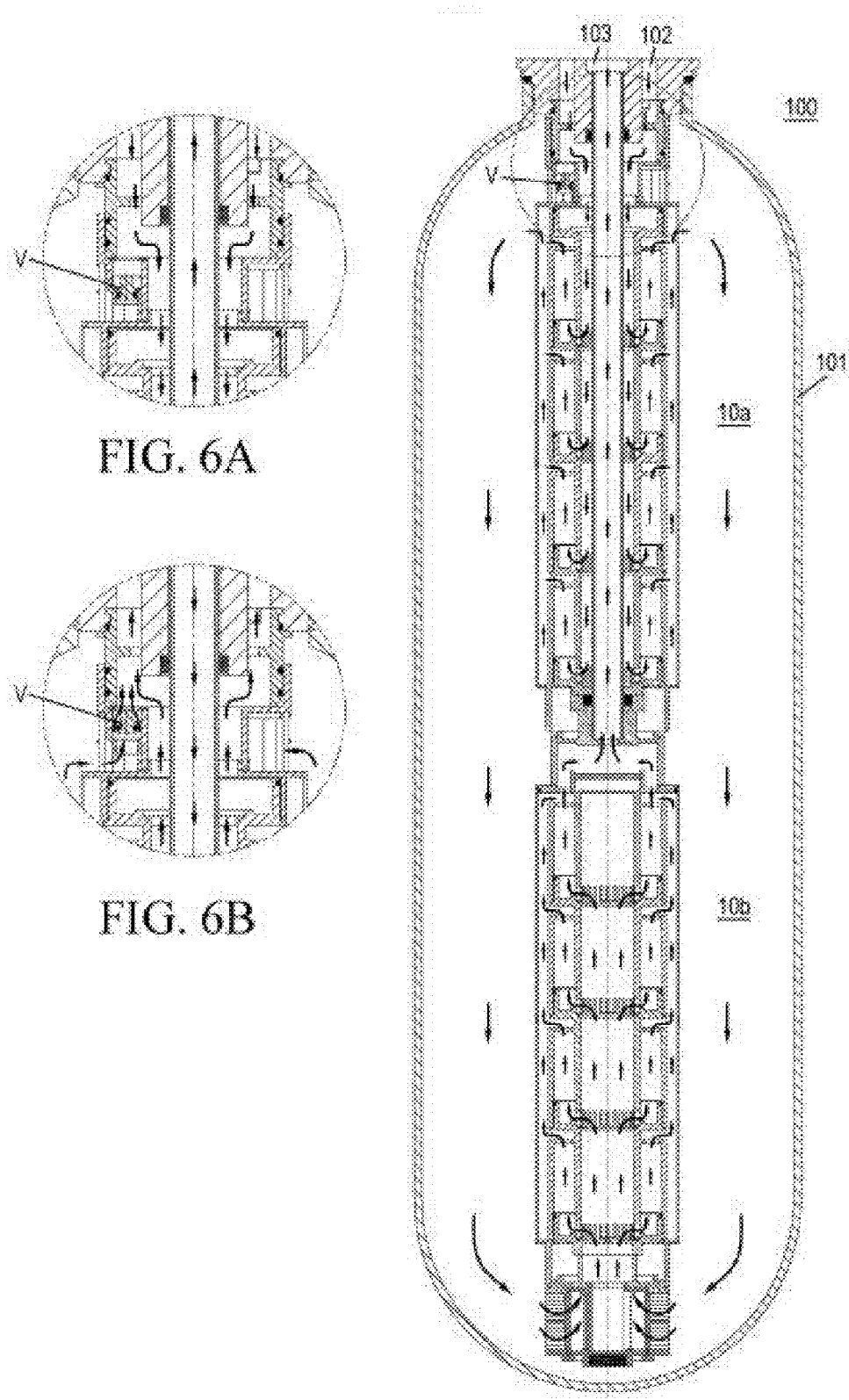
FIG. 6 is a schematic view of a fluid treatment device according to a sixth embodiment of the present invention.
FIGS. 6A and 6B are partially enlarged views of the by-pass valve employed in the fluid treatment device shown in FIG. 6

FIG. 6 is a schematic view of the fluid treatment device according to a sixth embodiment of the present invention.

In the fluid treatment device according to this embodiment, a group of treatment assemblies consisting of two treatment assemblies are arranged in a stacked and series connection manner, and the fine grinding fluid treatment medium is optionally provided in the tank body below the group of the treatment assemblies. The upper treatment assembly is substantially the same as the treatment assembly as shown in FIG. 1, and same contents are not repeatedly described herein; the lower treatment assembly is substantially the same as the treatment assembly as shown in FIG. 3, and same contents are not repeatedly described herein either. Herein, the upper and lower treatment assemblies share the same axis (i.e., the cylinder axis of respective treatment units), the stacked two treatment assemblies as a whole are in an elongated shape, which is suitable for being placed in an elongated tank body.

The arrows shown in FIG. 6 represent a water flow direction when the device is in normal operation. As shown in the drawing, the water entering into the tank body firstly flows through the first passage, each treatment unit, the second passage of the upper assembly, and subsequently reach the fine grinding fluid treatment medium in the tank body; and the water after passing through the fine grinding fluid treatment medium in the tank body flows through the second passage, each treatment unit, the third and fourth passages of the lower assembly in sequence, and is finally discharged out of the tank body from the discharge outlet 103.

The water can be further purified after the treatment of the above combined two treatment assemblies. That is, a strengthened treatment effect can be obtained. In addition, it is easily conceivable for a person skilled in the art therefrom to properly combine the two assemblies to allow the water entering into the tank body to firstly pass through the lower assembly and then to pass through the upper assembly. Furthermore, a person skilled in the art is also easily conceivable that an appropriate number of (e.g., three, four or more) treatment assemblies can be connected in serial upon needs of the use.

In this embodiment, a by-pass valve is provided similarly as in the first embodiment. The by-pass valve is provided above the upper treatment units, as shown in FIGS. 6A and 6B. In backwash, the water for backwash firstly pass through the lower treatment assembly and the fine grinding fluid treatment medium in the tank body, then is directly guided from the second passage of the upper treatment units into the first passage though the by-pass valve.

Figure 7A:
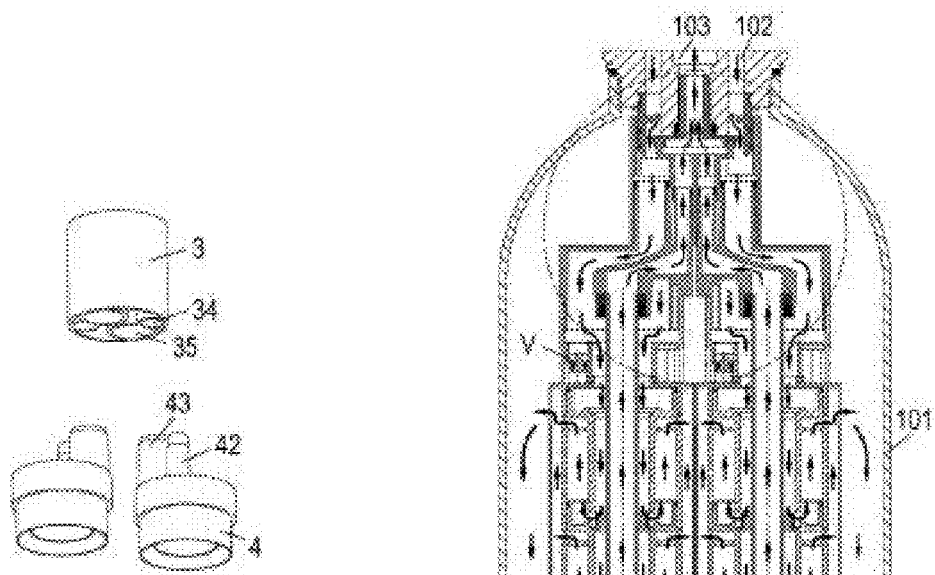
FIG. 7A is an exploded perspective view of the adapting unit employed in the fluid treatment device shown in FIG. 7.
Figure 7B:
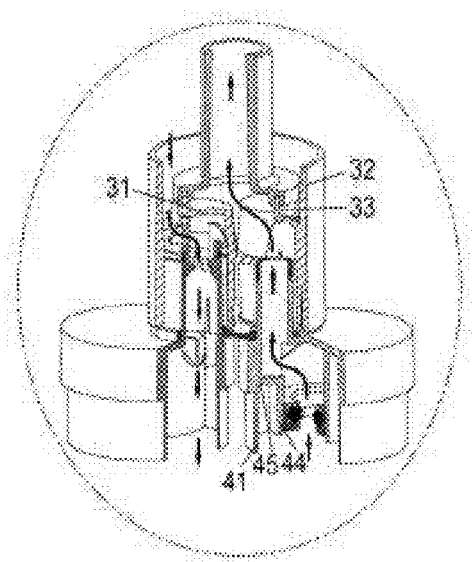
FIG. 7B is an assembly sectional view of the adapting unit shown in FIG. 7A.
Figure 7:
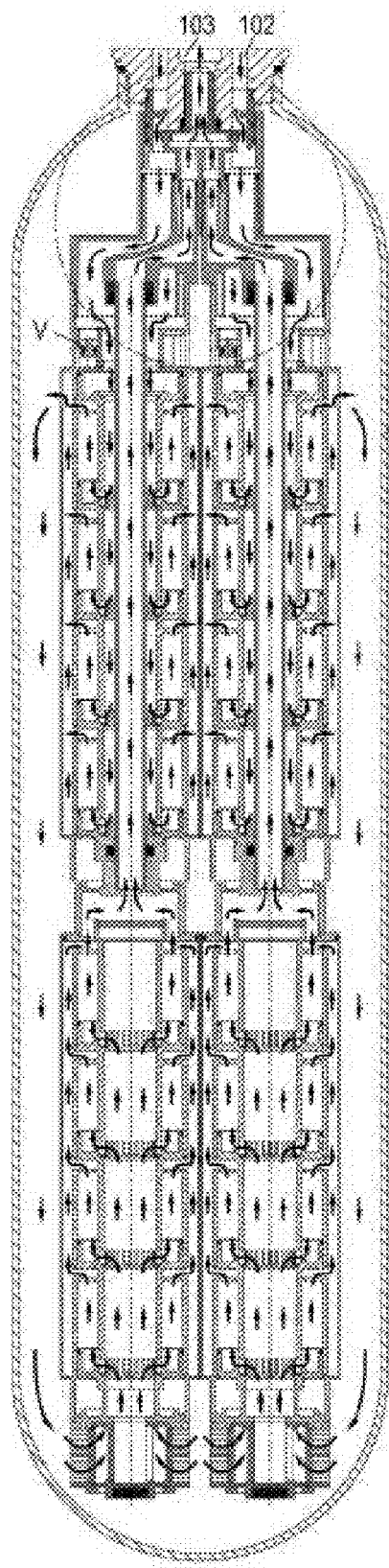
FIG. 7 is a schematic view of a fluid treatment device according to a seventh embodiment of the present invention.

FIG. 7 is a schematic view of the fluid treatment device according to a seventh embodiment of the present invention. In this embodiment, four treatment assemblies are schematically assembled in the tank body of the fluid treatment device, and each treatment assembly exemplarily comprises four treatment units. Here, a person skilled in the art easily conceives of setting other number of the treatment assemblies and the treatment units upon needs. As shown in FIG. 7, the four treatment assemblies are divided into left and right groups, each group of the treatment assemblies are the same as that shown in FIG. 6, and the fine grinding fluid treatment medium is optionally provided in the tank body below each group of the treatment assemblies. The arrows in FIG. 7 show a water flow direction, it can be seen that the water flow direction of each group of the treatment assemblies is substantially the same as that shown in FIG. 6

In order to combine these treatment assemblies, an adaptor and a connector are used in this embodiment. The above two each can be used individually, and are preferably combined together as an adapting unit. Moreover, the adapting units are preferably combined with each other. FIG. 7A is an exploded perspective view of the adapting unit, and FIG. 7B is an assembly sectional view of the adapting unit shown in FIG. 7A.

The adaptor is shown in an upper portion of FIG. 7A, which is used to distribute the water flow from the introduction inlet 102 of the tank body or from an upstream adapting unit to a plurality of passages, and collects and outputs the water flow from the interior of the tank body or from a plurality of passages of a downstream adapting unit. As shown in the drawing, the adaptor has a cylindrical adapting outer wall and one adapting partition board in the adapting outer wall. An upper side of the adapting partition board in the drawing forms a main stream passage portion. Specifically, the adapting partition board is provided with a cylindrical adapting inner wall thereon. It is preferable that the adapting inner wall and the adapting outer wall are concentrically arranged. Thus, a first adapting passage is formed between the adapting inner wall and the adapting outer wall, and a second adapting passage is formed inside of the adapting inner wall. In this embodiment, the first adapting passage is used to guide the water to flow into the treatment assembly and the second adapting passage is used to guide the water to flow out of the treatment assembly. However, it is also possible that the first adapting passage is used to guide the water to flow out of the treatment assembly and the second adapting passage is used to guide the water to flow into the treatment assembly.

A branch passage portion is formed at a lower side of the adapting partition board. Specifically, two first branch passages and two second branch passages are provided below the adapting partition board. Each first branch passage is communicated with the first adapting passage through corresponding openings on the adapting partition board, and each second branch passage is communicated with the second adapting passage through corresponding openings on the adapting partition board. The branch passages each is preferably in a circular tube shape, and more preferably, the first and second branch passages have different diameters in order to avoid confusion. Here, a number of the first branch passage and a number of the second branch passage may be more than two, for example, three, four or more of them can be provided. The number of the first branch passages and the number of the second branch passages are preferably equal, but not necessarily. In this embodiment, one first branch passage and one second branch passage constitute a pair of branch passages. The whole adaptor comprises two pairs of branch passages in total. That is to say, one water flow introduced by the first adapting passage is divided into two water flows by two passages to flow out.

The connector is shown in a lower portion of FIG. 7A, which is used to introduce the water flow from one of two independent waterpipes into the treatment assembly of the present invention and to discharge the water flow from the treatment assembly through the other of the above two independent waterpipes.

The connector has an upper portion and a lower portion separated by a connection partition board, the upper portion comprises a first mouthpiece and a second mouthpiece which upwardly extend side by side from the connection partition board, both of them are in a tubular shape. The lower portion comprises a cylindrical connection inner wall extending downwardly from the connection board and a cylindrical connection outer wall enclosing the connection inner wall, both of them are preferably arranged concentrically. A first connection passage is formed between the connection inner wall and the connection outer wall, and the first connection passage is communicated with the first mouthpiece though openings on the connection partition board. A second connection passage is formed inside of the connection inner wall, and is communicated with the second mouthpiece though openings on the connection partition board. In this connector, the connection outer wall is adapted to be hermetically cooperated with the assembly inlet of the treatment assembly in this embodiment, and the connection inner wall is adapted to be hermetically cooperated with the assembly outlet of the treatment assembly in this embodiment.

More than one adaptor and a plurality of connectors preferable have matched sizes so as to be combined into one adapting unit. In this embodiment, each first branch passage of the adaptor is adapted to be cooperated with the first mouthpiece of the connector so as to be hermetically connected therewith, thereby forming an individual water flow passage, while each second branch passage of the adaptor is adapted to be cooperated with the second mouthpiece of the connector so as to be hermetically connected therewith, thereby also forming another individual water flow passage. Thus, one adaptor can be connected with tow connectors, as shown in FIG. 7B. Herein, if the adaptor has more than two first branch passages and more than two second branch passages, it can be connected with more than two connectors.

On the other hand, it is preferable that the adapting inner wall of the adaptor is adapted to be cooperated with (preferably insertion cooperation) the connection inner wall of the connector to realize a hermetical connection, and the adapting outer wall of the adaptor is adapted to be cooperated with (preferably insertion cooperation) the connection outer wall of the connector to realize a hermetical connection. Thus, the adaptor of one adapting unit is adapted to be connected with the connector of another adapting unit. A further distributary/confluence can be achieved through such further extension.

In the embodiment shown in FIG. 7, one adapting unit is used to supply water for two groups of the treatment assemblies, and is also used to receive the water from the treatment assemblies. With the help of such adapting unit, even in a case where the tank body has slim openings, as much treatment assemblies as possible also can be provided in the tank body, thus space in the tank body can be sufficiently utilized and treatment ability can be enhanced.

Figure 8:
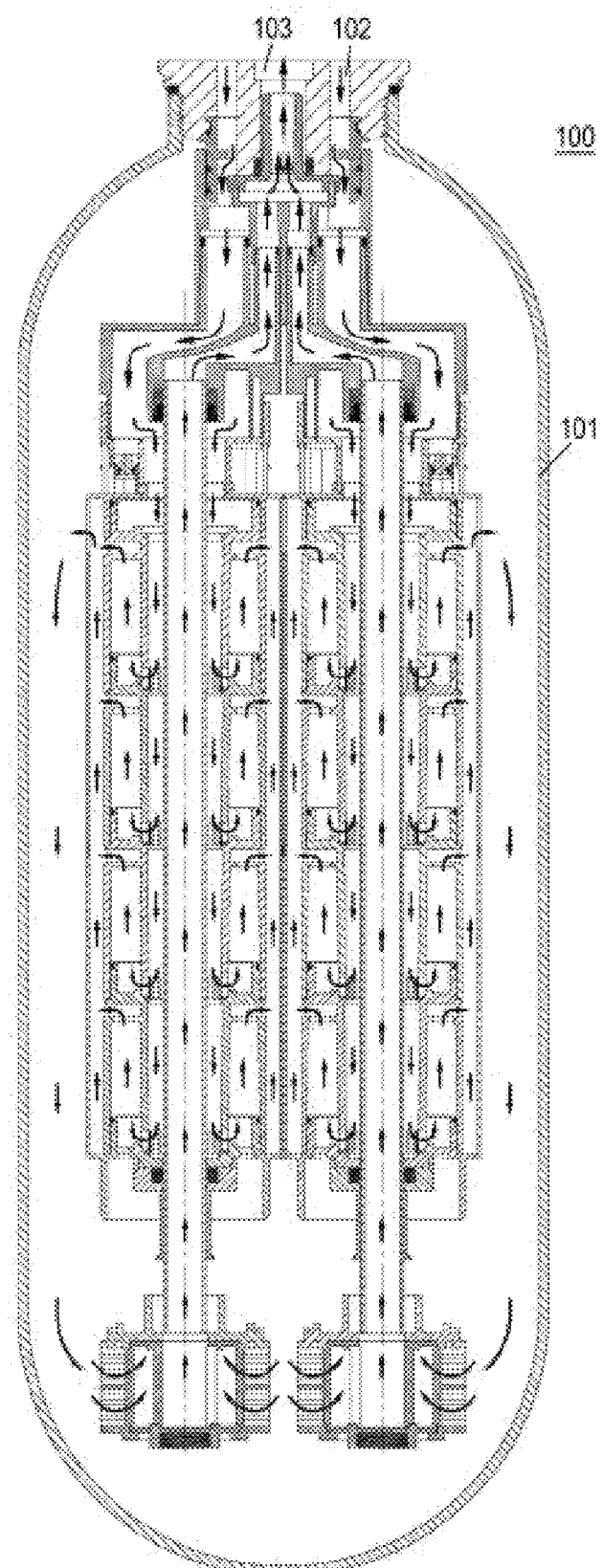
FIG. 8 is a schematic view of a fluid treatment device according to an eighth embodiment of the present invention.

FIG. 8 is a schematic view of the fluid treatment device according to an eighth embodiment of the present invention. In this embodiment, two treatment assemblies are arranged in parallel and side by side in the tank body, it is preferably connected with the fine grinding fluid treatment medium in the tank body below each treatment assembly. Configurations of the each treatment assembly is the same as that of the treatment assembly shown in FIG. 2, the same content therefore is not repeatedly described herein. One treatment unit shown in FIG. 7B is used in this embodiment, wherein each treatment assembly is connected with one connector of the treatment unit and the adaptor of the treatment unit is connected with the introduction inlet 102 and the discharge outlet 103 of the tank body. Since two treatment assemblies are arranged side by side along a horizontal direction instead of being vertically stacked, it is conductive to decreasing a height of the space which they occupy.

Figure 9:
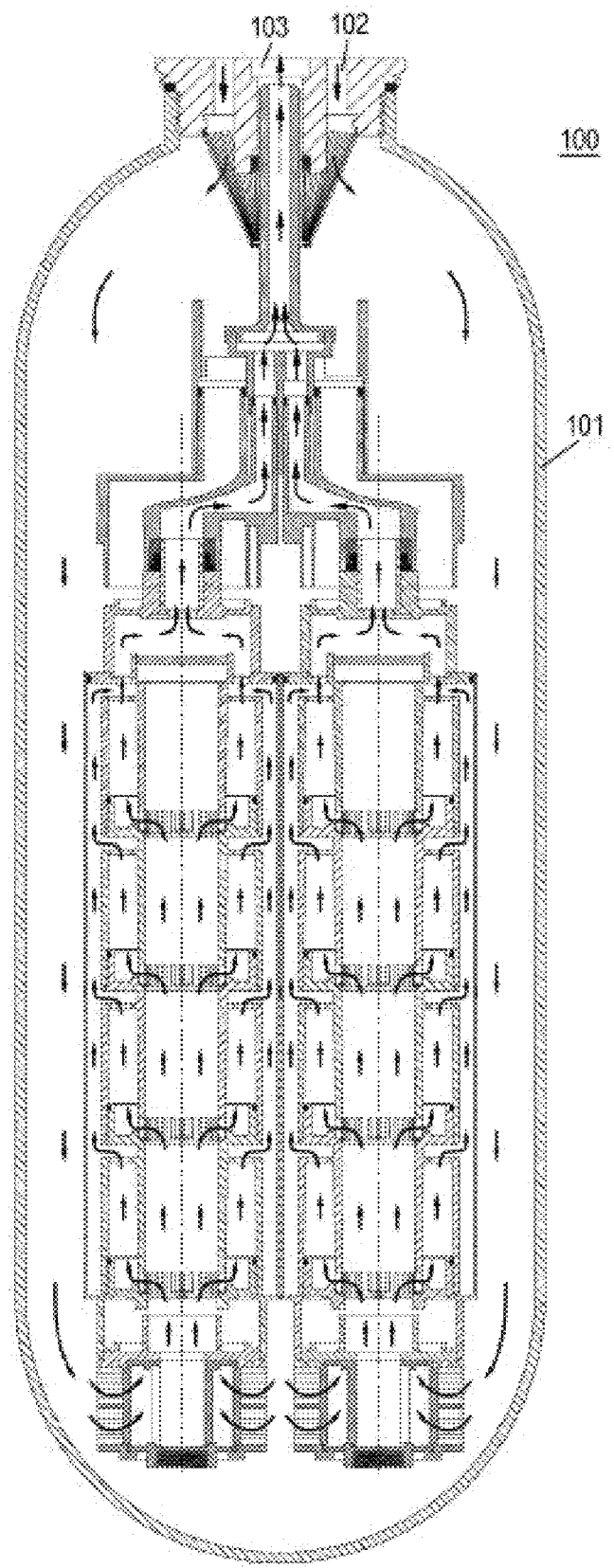
FIG. 9 is a schematic view of a fluid treatment device according to a ninth embodiment of the present invention.

FIG. 9 is a schematic view of the fluid treatment device according to a ninth embodiment of the present invention. In this embodiment, two treatment assemblies are arranged side by side in the tank body, and it is preferably connected with the fine grinding fluid treatment medium in the tank body below each treatment assembly. Configurations of the each treatment assembly is the same as that of the treatment assembly shown in FIG. 3, the same content therefore is not repeatedly described herein. One treatment unit shown in FIG. 7B is also used in this embodiment, wherein each treatment assembly is connected with one connector of the treatment unit and the adaptor of the treatment unit is connected with the introduction inlet 102 and the discharge outlet 103 of the tank body.

Figure 10:
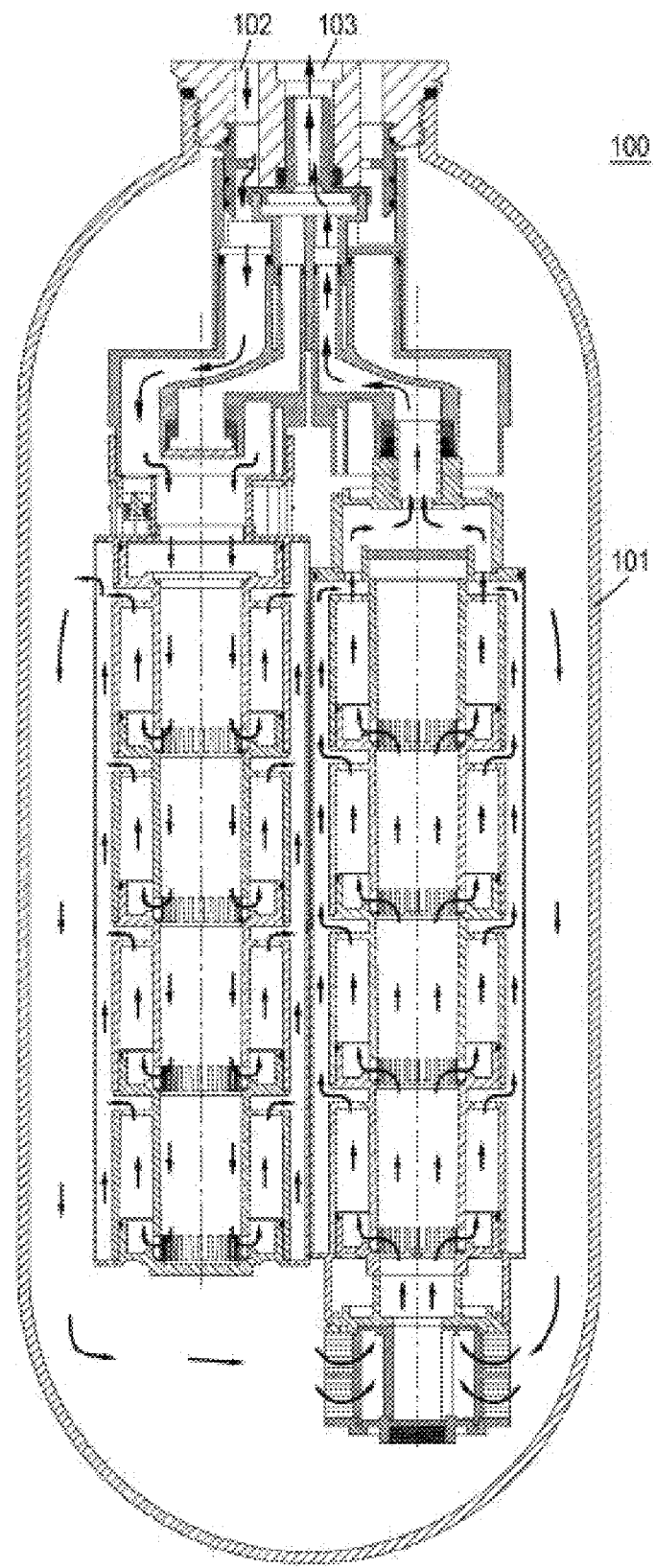
FIG. 10 is a schematic view of a fluid treatment device according to a tenth embodiment of the present invention.

FIG. 10 is a schematic view of the fluid treatment device according to a tenth embodiment of the present invention. In this embodiment, two treatment assemblies are arranged in series in the tank body. The treatment assembly in the left side of the drawing is an upstream treatment assembly, while the treatment assembly in the right side of the drawing is a downstream treatment assembly. The upstream treatment assembly is connected with one connector (i.e., the upstream connector) of one adapting unit, while the downstream treatment assembly is connected with the other connector (i.e., the downstream connector) of the adapting unit. In the upstream treatment assembly, water enters into a passage formed by the inner walls 11 of each treatment unit from the first connection passage of the connector, and subsequently flows through each treatment unit. As shown in the drawing, the second connection passage (or the second mouthpiece) of the upstream connector, which is connected with the upstream treatment assembly, is blocked and no water entry is allowed. This is because that the water flowing through each unit is not required to be discharged through the second connection passage. The water flowing out from the upstream treatment assembly enters into the downstream treatment assembly after passing through the fine grinding fluid treatment medium in the tank body which is located below the downstream treatment assembly. The water enters into each unit through the passage formed by the inner wall 11 of the downstream treatment assembly, and is discharged through the second connection passage of the downstream connector after being treated by the units. The first mouthpiece (or the first connection passage) of the downstream connector is blocked and no water entry is allowed.

In comparison with the embodiment shown in FIG. 6, thus-arranged two treatment assemblies are arranged side by side, and thus no height is increased. It is therefore suitable for a tank body with a smaller height.

Figure 11:
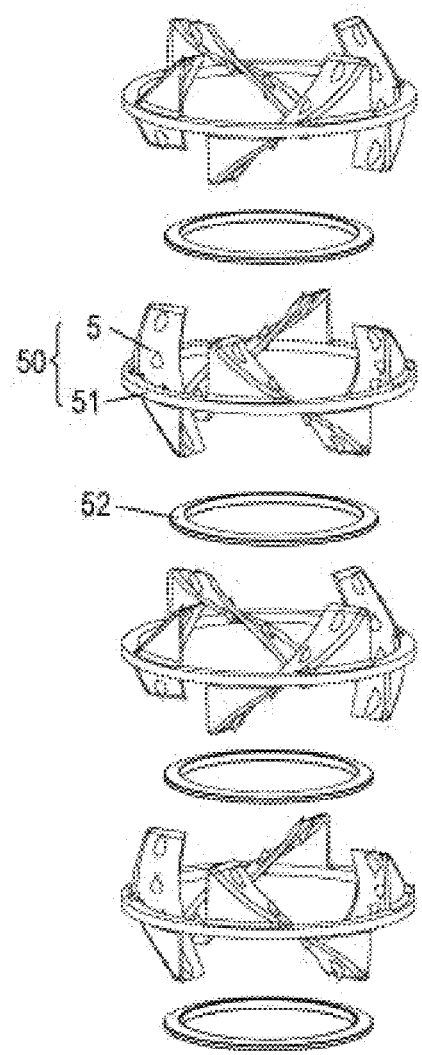
FIG. 11 is a perspective view of a guiding plate available for the fluid treatment unit of the present invention.

FIG. 11 is a perspective view of a guiding plate that may be employed in the fluid treatment unit of the present invention. In this improved treatment unit, in order to lengthen the water flow path and improves the treatment effect, a guide plate is used in the present invention to compel a water flow path to turn around. As shown in the drawing, a spiral guide plate is provided between the inner wall 11 and the outer wall 12 of the treatment unit, and the spiral guide plate has a substantially horizontal upper edge and a substantially horizontal lower edge, and a helix-shaped inner edge and a helix-shaped outer edge that are positioned at a radial inner side and a radial outer side, respectively. The inner edge of the guide plate is preferably in contact with the inner wall 11, and the outer edge thereof is preferably in contact with the outer wall 12. Water is changed to flow outwardly upon contacting with the inner edge, and is changed to flow inwardly upon contacting with the outer edge. As a result, an opportunity of water contacting with the inner wall 11 and the outer wall 12 is reduced, and finally, an opportunity of the water contacting with the fine grinding treatment medium in the fluid treatment unit is increased, thereby achieving an optimal filtering effect. Due to the existence of the guide plate, the water entering from the unit inlet 15 will not directly flow upwardly toward the unit outlet 16, but flows along a spiral direction under the compelling guide of the guide plate, thereby increasing both the flow route and the time to be treated.

In order to enable the water entering into the unit to be evenly treated, it is preferable that a plurality of spiral guide plates are used. These spiral guide plates have the same pitch and are distributed at intervals. For example, four same spiral guide plates can be arranged between the inner wall 11 and the outer wall 12. These guide plates are preferably at equal intervals. Of course, no matter one spiral guide plate or a plurality of spiral guide plates are used, whether the spiral shapes are the same or different, their spiral angles and heights are easily determinable to a person skilled in the art according to the present invention.

For convenience of manufacture and assembly, it is preferable that a plurality of guide plates are formed into one piece through an annular connection member so as to constitute a guide unit. A height or a number of the guide units can be set by a person skilled in the art according to use condition. For example, one, two or more guide units are arranged within the height of the inner chamber of the whole unit. Although the guide unit preferably occupies the whole chamber, it is not necessarily the case. For example, the guide unit may be merely arranged at a lower half portion of the unit. If two or more guide units are arranged in a single unit chamber, spiral directions of these guide units may be the same, but it is also possible to arrange them in a manner of adjacent guide plates having opposite spiral directions.

As shown in FIG. 11, four guide units are used in one treatment unit in the present invention, wherein each of the guide units has four guide plates, and a height of each of the guide units is about a quarter of the height of the unit inner chamber; and, adjacent guide plates have opposite spiral directions, lower edges of the upper guide plates and upper edges of the lower guide plates are located within a same plane extending up and down. By means of the treatment unit with such configuration, the water flow flows along a broken line from bottom to top.

In order to avoid staggered overlap of respective guide units in an up and down direction, a separating ring is preferably provided between adjacent guide units. The separating ring is located between the inner wall 11 and the outer wall 12 of the treatment unit, and its width along a radial direction of the treatment unit is smaller than a radial direction width of the annular chamber of the treatment unit, so that two adjacent guide plates along the up and down direction are separated in the case of not blocking the water flow as far as possible.

In addition to increasing the flow route and the treatment time, the guide plates or guide units provided as above also can enhance the self-cleaning effect of fine grinding treatment medium in the unit chamber. This is because medium particles will strike on the guide plates under the action of upward water flow, and the number and intensity of the striking between the medium particles will also increase, so that the dirt on the particle surfaces can be cleaned off more effectively.

The guide plate in this invention is not strictly restricted to be in a spiral shape, it may be a flat plate inclined relative to the axis of the cylinder of the unit, or a generally-inclined plate with steps, as long as it can guide the water flow to flow along a direction inclined relative to the axis of the cylinder of the unit. Moreover, an inclined angle of the guide plates relative to the axis of the treatment unit also can be set upon actual conditions, preferably being about 45 degrees. In addition, it is also easily conceivable for a person skilled in the art that a guide plate integrally formed with the inner wall 11 also can be provided and the guide plate protrudes outwards from the inner wall 11; and a guide plate integrally formed with the outer wall 12 also can be provided and the guide plate protrudes inwards from the outer wall 12. Preferably, spiral guide plates are provided on both the inner wall 11 and the outer wall 12, the inner wall 11 and the outer wall 12 are assembled together by relative rotation, and these guide plates are separated one another after the inner wall 11 and the outer wall 12 being assembled, so that the effect of the above guide plates also can be achieved. In addition, if the tank body is empty, the outer cylinder is not required.

What is claimed is:

1. A fluid treatment device comprising:
a tank body having an introduction inlet to introduce fluid into the tank body and a discharge outlet to discharge the fluid from the tank body;
a fluid treatment unit to treat the fluid to be introduced into the tank body, the fluid treatment unit including a chamber accommodating a fine grinding fluid treatment medium therein, the chamber having a unit inlet and a unit outlet, the fluid to leave the chamber via the unit outlet after entering the chamber via the unit inlet and being treated by the fluid treatment medium, the unit inlet located on a lower portion of the chamber and the unit outlet located on an upper portion of the chamber, the unit outlet positioned above the unit inlet in a vertical direction, the chamber defined by a cylindrical inner wall, a cylindrical outer wall enclosing the inner wall and spaced therefrom, and an upper wall and a lower wall between the inner and outer walls, the upper wall positioned above the lower wall and spaced therefrom; and
a guide plate positioned between the inner wall and the outer wall of the chamber, the guide plate having a substantially horizontal upper edge and a substantially horizontal lower edge, the guide plate having an inner edge at a radial inner side and an outer edge at a radial outer side, the guide plate being one of a plurality of guide plates, the plurality of guide plates physically interconnected via an annular connection member, the plurality of guide plates and the annular connection member constituting a guide unit, the guide unit being one of a plurality of guide units, the plurality of guide units arranged within a height of the chamber of the fluid treatment unit, a separating ring is positioned between adjacent ones of the plurality of guide units, the separating ring located between the inner wall and the outer wall of the fluid treatment unit, the separating ring having a width along a radial direction of the fluid treatment unit that is smaller than a radial direction width of the chamber of the fluid treatment unit.

2. The fluid treatment device according to claim 1, wherein the unit inlet is located on at least one of the lower wall or a lower portion of the inner wall, and the unit outlet is located on at least one of the upper wall or an upper portion of the outer wall.

3. The fluid treatment device according to claim 1, wherein the unit inlet is located on at least one of the lower wall or a lower portion of the outer wall, and the unit outlet is located on at least one of the upper wall or an upper portion of the inner wall.

4. The fluid treatment device according to claim 1, wherein the fluid treatment unit is one of a plurality of vertically stacked fluid treatment units detachably connected together as a group to be provided in the tank body.

5. The fluid treatment device according to claim 4, wherein the fluid introduced at the introduction inlet is to enter respective ones of the plurality of fluid treatment units via the corresponding unit inlet of a corresponding one of the fluid treatment units, the fluid to be discharged out of the respective ones of the plurality of fluid treatment units via the corresponding unit outlet of the corresponding one of the fluid treatment units.

6. The fluid treatment device according to claim 4, wherein the fluid is to flow out of the unit outlet of a first fluid treatment unit and enter into the unit inlet of a second fluid treatment unit adjacent the first fluid treatment unit.

7. The fluid treatment device according to claim 4, further including an inner cylinder extending in a space formed by inner walls of the vertically stacked fluid treatment units and an outer cylinder enclosing the vertically stacked fluid treatment units, a first passage defined between the inner cylinder and the inner walls of the fluid treatment units, a second passage defined between the outer cylinder and outer walls of the fluid treatment units, a third passage defined between the outer cylinder and the tank body, and a fourth passage defined inside of the inner cylinder, the fluid introduced into the tank body at the introduction inlet to sequentially flow through (1) the first passage, (2) ones of the plurality of fluid treatment units, (3) the second passage, (4) the third passage, and (5) the fourth passage before being discharged from the tank body through the discharge outlet.

8. The fluid treatment device according to claim 7, further including a second fine grinding fluid treatment medium within the tank body between the third and fourth passages, the fluid to enter into the fourth passage from the third passage after passing through the second fine grinding fluid treatment medium in the tank body.

9. The fluid treatment device according to claim 4, further including an outer cylinder enclosing the plurality of vertically stacked fluid treatment units, a first passage defined between the tank body and the outer cylinder, a second passage defined inside of inner walls of the plurality of vertically stacked fluid treatment units, a third passage defined between the outer cylinder and outer walls of the plurality of vertically stacked fluid treatment units, the fluid introduced into the tank body at the introduction inlet to sequentially flow through (1) the first passage, (2) the second passage, (3) ones of the plurality of vertically stacked fluid treatment units, and (4) the third passage before being discharged from the tank body through the discharge outlet.

10. The fluid treatment device according to claim 9, further including a second fine grinding fluid treatment medium within the tank body between the first and second passages, the fluid to enter into the second passage from the first passage after passing through the second fine grinding fluid treatment medium in the tank body.

11. The fluid treatment device according to claim 4, further including an outer cylinder enclosing the plurality of vertically stacked fluid treatment units, a first passage defined between the tank body and the outer cylinder, a second passage defined between the outer cylinder and outer walls of the plurality of vertically stacked fluid treatment units, and a third passage defined inside of inner walls of the plurality of vertically stacked fluid treatment units, the fluid introduced into the tank body at the introduction inlet to sequentially flow through (1) the first passage, (2) the second passage, (3) ones of the plurality of vertically stacked fluid treatment units, and (4) the third passage before being discharged from the tank body through the discharge outlet.

12. The fluid treatment device according to claim 11, wherein the fluid is to enter into the second passage from the first passage after passing through a second fine grinding fluid treatment medium in the tank body.

13. The fluid treatment device according to claim 1, wherein the guide plate is a spiral guide plate, the inner edge is a helix-shaped inner edge, and the outer edge is a helix-shaped outer edge.

14. The fluid treatment device according to claim 13, wherein the inner edge of the guide plate is in contact with the inner wall, and the outer edge of the guide plate is in contact with the outer wall.

15. The fluid treatment device according to claim 13, wherein the spiral guide plate is one of a plurality of spiral guide plates, each of the plurality of spiral guide plates having a same pitch, the plurality of spiral guide plates distributed at intervals about a central axis.

* * * * *